US005788399A

United States Patent [19]

Smearsoll

[11] Patent Number: 5,788,399
[45] Date of Patent: Aug. 4, 1998

[54] SNAP RING

[75] Inventor: Mark V. Smearsoll, Wixom, Mich.

[73] Assignee: Ford Global Technologies, Inc., Dearborn, Mich.

[21] Appl. No.: 804,860

[22] Filed: Feb. 24, 1997

[51] Int. Cl.$^6$ .................................................. F16B 1/02
[52] U.S. Cl. .......................... 403/327; 403/348; 403/319
[58] Field of Search .............................. 403/327, 328, 403/326, 348, 155, 154, 319, 315, 329, 350, 351

[56] References Cited

U.S. PATENT DOCUMENTS

| 2,496,928 | 2/1950 | Bing et al. | 403/348 X |
|---|---|---|---|
| 2,541,526 | 2/1951 | Lundquist | 403/348 |
| 3,853,413 | 12/1974 | Parran . | |
| 4,242,775 | 1/1981 | Eickmann | 403/326 X |
| 4,405,274 | 9/1983 | Saitoh et al. . | |
| 4,408,383 | 10/1983 | Nottingham et al. | 403/328 X |
| 5,054,952 | 10/1991 | Chara | 403/326 |
| 5,085,548 | 2/1992 | Moyles . | |
| 5,121,653 | 6/1992 | Sigler | 403/335 X |
| 5,181,792 | 1/1993 | Grochowski . | |
| 5,234,278 | 8/1993 | Hall, III et al. | 403/326 X |
| 5,308,207 | 5/1994 | Jaskowiak . | |
| 5,347,673 | 9/1994 | Nickels, Jr. | 403/348 X |
| 5,409,256 | 4/1995 | Gordon et al. | 403/348 X |

Primary Examiner—Harry C. Kim
Attorney, Agent, or Firm—James J. Dottavio

[57] ABSTRACT

A snap ring for axially retaining a rotating member, comprising a generally annular member having an inner peripheral surface and an outer surface with a tooth projecting therefrom. The snap ring further comprises a substantially elastically deflectable tab projecting from the annular member for preventing rotation of said annular member. The tab has a first position prior to installation and a second deflected position during installation. The tab resiliently returns substantially to the first position during installation.

15 Claims, 5 Drawing Sheets

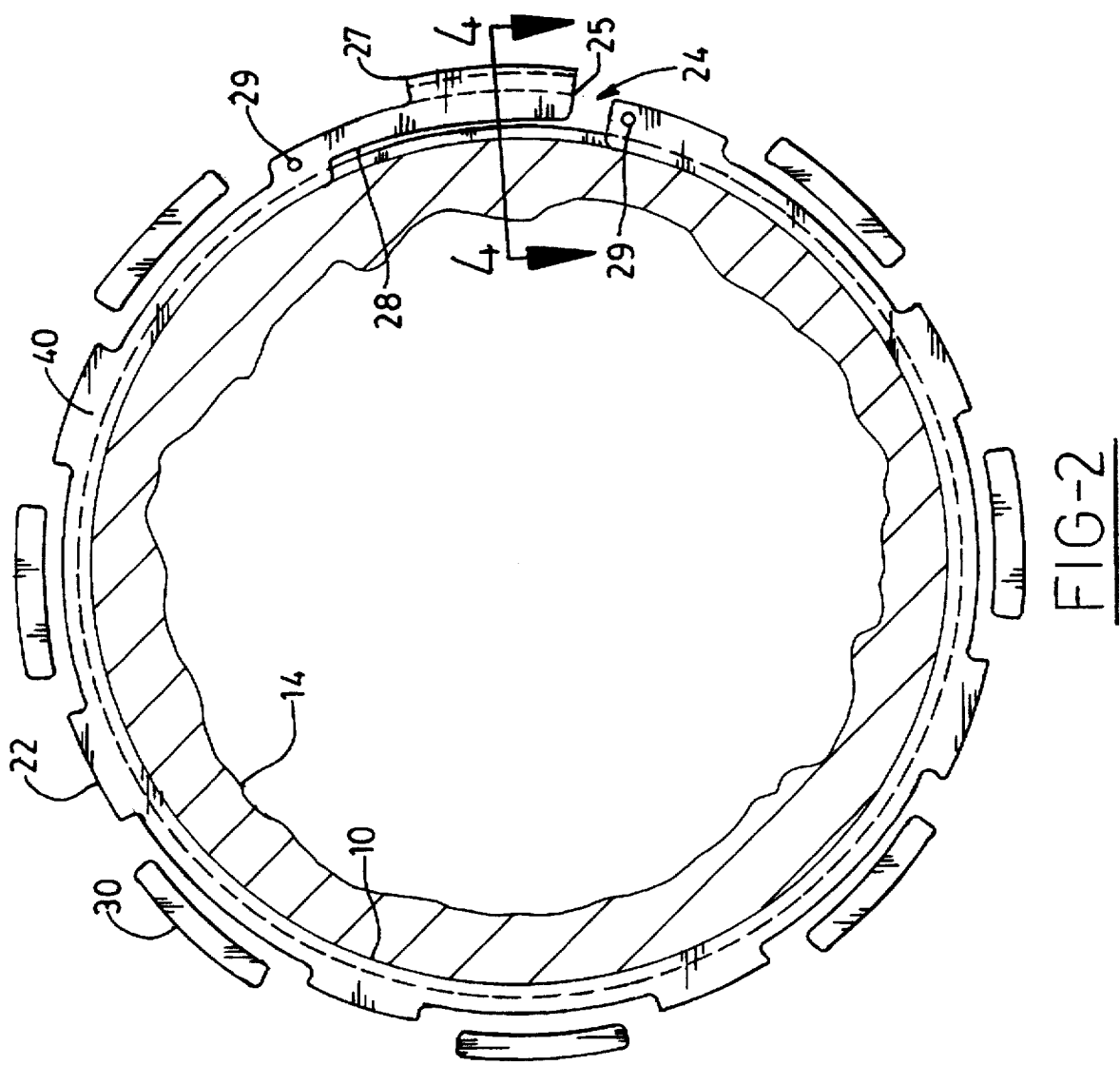
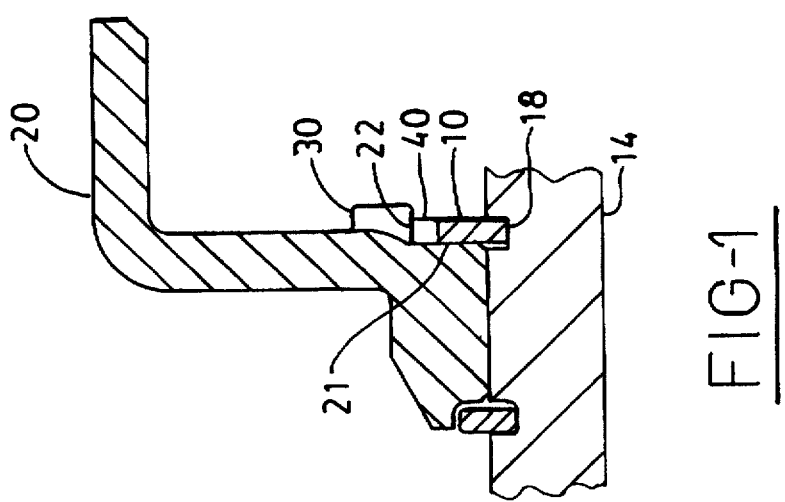

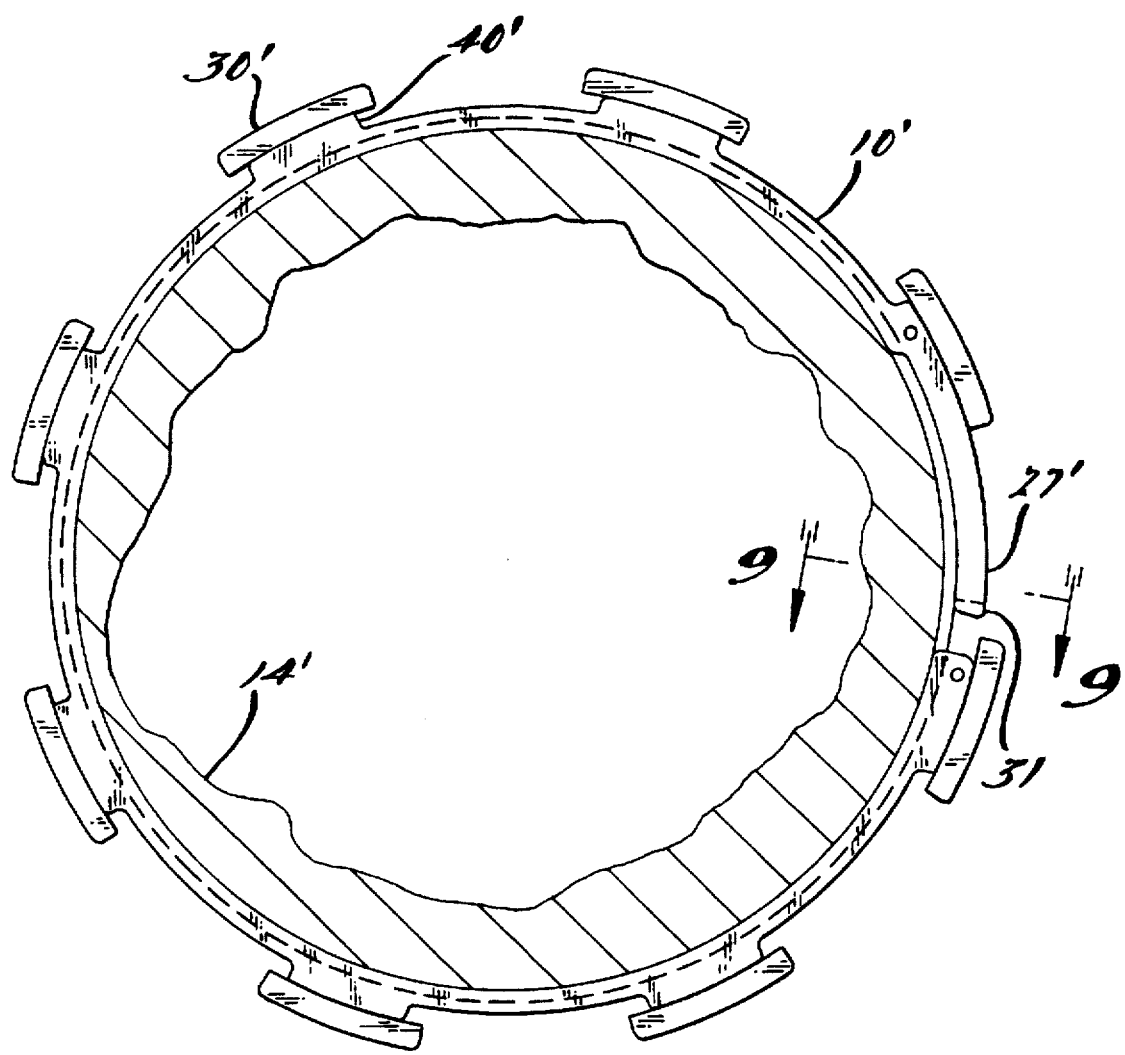
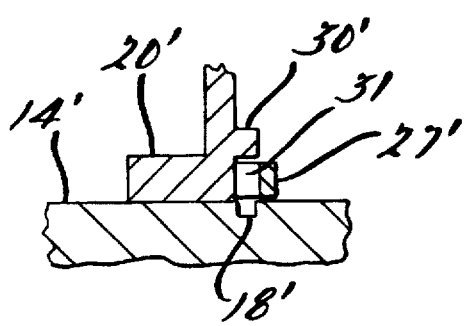
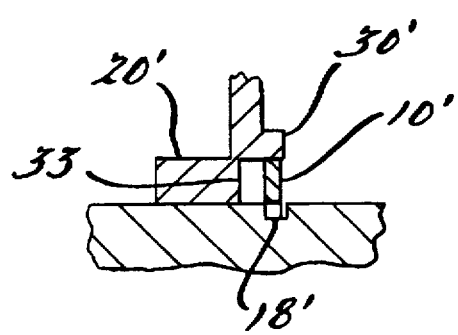

SNAP RING

BACKGROUND OF THE INVENTION

1. Field of the Invention

This invention relates to a snap ring, and more particularly to an external snap ring having means to prevent disengagement at high rotational speeds due to centrifugal force.

2. Prior Art

Snap rings are provided generally to prevent axial and/or rotational movement of one coaxial partially coextensive member to a second member. Generally one of the members has an annular groove in which the snap ring is mounted. The second member is mounted on the first member and a radial face of the second member abuts the snap ring to prevent axial movement of the second member relative to the first member.

To prevent relative rotation, the snap ring is generally provided with a post. As shown in U.S. Pat. No. 5,308,207 ('207) in FIG. 1, a post 14 on the snap ring 10 engages an aperture 25 in the first member 24. The post thus fixes the snap ring against rotation relative to the first member in the '207 patent.

During high speed rotation of the members, centrifugal forces on the snap ring of prior art designs may cause the snap ring to expand radially and become dislodged from the groove of the first member. In such instances the snap ring is no longer effective to prevent relative movement of the members.

It would therefore be desirable to provide a snap ring which prevents axial and/or rotational relative movement and which has a means to prevent disengagement of the snap ring during high speed rotation.

SUMMARY OF THE INVENTION

It is an object of the present invention to provide a snap ring with means to prevent disengagement during high speed rotation. Advantages of the present invention include a provision to prevent rotation of the snap ring to at least one of the rotating members and a provision to prevent radial expansion of the snap ring during rotation due to centrifugal force. The present snap ring is inexpensive to manufacture and is easily installed.

A snap ring according to the present invention comprises a generally annular member having an inner peripheral surface and an outer surface with a tooth projecting therefrom. The snap ring further comprises a substantially elastically deflectable tab projecting from the annular member for preventing rotation of said annular member. The tab has a first position prior to installation and a second deflected position during installation. The tab resiliently returns substantially to the first position during installation.

BRIEF DESCRIPTION OF THE DRAWINGS

FIG. 1 is a partial cross-sectional view of a transmission hub and cylinder using a snap ring according to the present invention.

FIG. 2 is an end view of a snap ring according to the present invention during installation.

FIG. 8 is an end view of an alternate embodiment of a snap ring according to the present invention during installation.

FIG. 9 is a cross-sectional view of the snap ring shown in FIG. 8 during installation.

FIG. 10 is a second cross-sectional view of the snap ring shown in FIG. 8 after installation

DETAILED DESCRIPTION OF THE PREFERRED EMBODIMENTS

Figure 5:
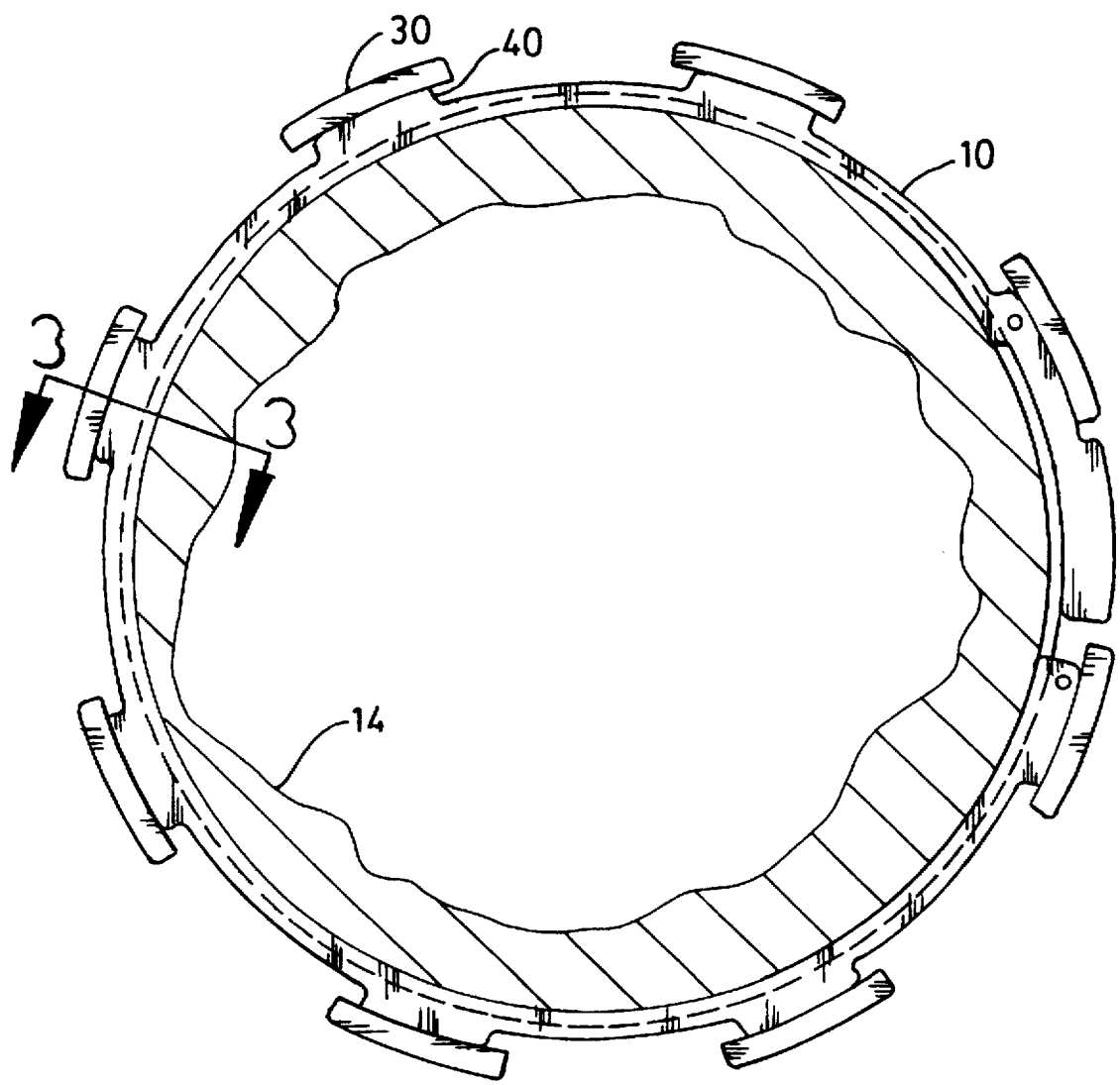
FIG. 5 is an end view of the snap ring view shown in FIG. 2 rotated to the installed position.

Referring to FIG. 1, a partial sectional view of an automatic transmission using a snap ring according to the present invention is shown. A snap ring 10 is mounted on a hub 14 within an annular groove 18 provided on the hub 14. A coaxial partially coextensive cylinder is mounted on the hub 14. The cylinder 20 has a radial face 21 abutting the snap ring 10 to prevent axial movement of the cylinder 20 relative to the hub 14. The cylinder 20 has a plurality of circumferentially spaced lugs 30 which include an inner surface which abuts the radially outer surface 22 of the snap ring 10 to prevent radial expansion of the snap ring 10. In the embodiment shown in FIG. 2, the cylinder 20 rotates relative to the hub 14.

As shown in FIG. 2, the outer surface 22 of the snap ring 10 is provided with a plurality of teeth 40 formed on the outer periphery of the snap ring 10. The teeth 40 are circumferentially spaced to correspond with the spacing of the cylinder lugs 30. As shown in FIG. 5, eight lugs 30 are provided as are eight teeth 40 in a preferred embodiment. During high speed rotation, the snap ring 10 radially expands outwardly by centrifugal forces on the snap ring 10. Radial interference between the teeth 40 and the lugs 30 prevent this radial expansion of the snap ring 10, and therefore the snap ring 10 is radially retained within the groove 18 to maintain the snap ring 10 in a position to prevent relative axial movement of the cylinder 20 and hub 14.

As shown in FIG. 2, the snap ring 10 is a generally annular member, having a discontinuity 24, or radial separation, in the periphery of the snap ring 10 to facilitate installation of the snap ring 10 over the hub 14 into the groove 18. A pair of apertures 29 are provided in the snap ring 10; the apertures 29 straddling the discontinuity 24 for installation of the snap ring 10 using pliers as is well known in the art.

Figure 3:
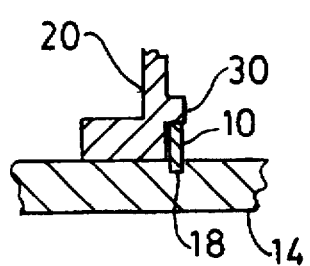
FIG. 3 is a cross-sectional view of the snap ring shown in FIG. 2 during installation.

During initial installation of the snap ring 10 as shown in FIG. 2, each of the teeth 40 of the snap ring 10 is aligned between two lugs 30 of the cylinder 20. The snap ring 10 is expanded (not shown) using the pliers to slide over the outer periphery of the hub 14. The snap ring 10 is then moved axially over the hub 14 until it is aligned with the groove 18. At this point, the pliers release the snap ring 10 so the snap ring 10 engages the annular groove 18 in the hub 14, as shown in FIG. 3, around most of the inner periphery of the snap ring 10.

A deflectable tab 27 is provided on the snap ring 10 adjacent the discontinuity 24 at one end 25 of the snap ring 10. In a preferred embodiment, the tab 27 is formed integrally with the snap ring 10 and projects radially outwardly from the outer periphery of the snap ring 10. During initial installation of the snap ring 10, the tab 27 interferes with one of the lugs 30 on the cylinder 20 as shown in FIG. 2 when the teeth 40 are aligned between the lugs 30 as described above.

Figure 4:
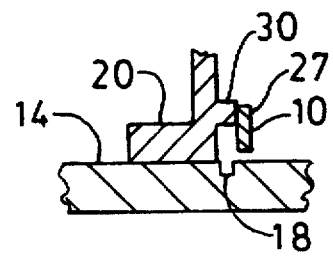
FIG. 4 is a second cross-sectional view of the snap ring shown in FIG. 2 during installation.

In a preferred embodiment, the snap ring 10 has a notch 28 provided at the inner surface of the snap ring 10 under the radial tab 27. The notch 28 permits axial deflection of the tab 27 during assembly, because the notch 28 does not engage the groove 18, as shown in FIG. 4. Thus, while the inner periphery of the snap ring is installed in the groove 18 around the remainder of the snap ring 10, as shown in FIG. 3, the tab 27 is axially deflected by lug 30. The snap ring 10 is then rotated until the teeth 40 are aligned circumferentially beneath the lugs 30 and the tab 27 is aligned between lugs 30 as shown in FIG. 5. During such rotation, as the tab 27 is aligned between two lugs 30, the tab 27 resiliently moves axially from the position shown in FIG. 4 to become substantially axially aligned with the rest of the snap ring 10 and the circumferential groove 18. The lugs 30 then prevent rotation of the snap ring 10 due to rotational interference between the tab 27 and the lugs 30, after the tab 27 is rotated to a position between two lugs 30. Preferably the deflection of the tab is produced by substantially elastic deformation of the snap ring 10 so the tab 27 is axially aligned between the lugs 30 when the snap ring 10 is rotated. In an alternative embodiment, the tab is plastically deformed to engage a lug 30, after the teeth 40 are aligned beneath the lugs 30 as described above.

In an alternative embodiment, the notch (not shown) comprises a punched-out slot in the annular snap ring 10 from the open end of the separation under the tab 27, coextensive with the tab 27. Thus the tab 27 is able to deflect axially from the remainder of the snap ring in a manner similar to that described above.

An alternative embodiment is shown in FIGS. 8–10, the numbers of the features corresponding to the prior figures denoted with a prime. A tab 27' is provided on the snap ring 10. A flange 31 projects axially from the flange 27' on the snap ring 10'. The axially projecting flange 31 engages an axially directed aperture 33 or notch (not shown) in the cylinder 20' to prevent rotation between the snap ring 10' and the cylinder 20' and thus maintain rotational alignment between the teeth and lugs as described above. As shown in FIG. 9, during installation the flange 31 is initially not aligned with the aperture 33, and thus the snap ring 10' is not axially aligned with the groove 18'. After the snap ring 10' is rotated as described above with reference to FIGS. 1–7, the flange 31 rotationally aligns with the aperture 33 and the flange 31 engages the aperture 33 as shown in FIG. 10, and the snap ring 10' is then axially aligned with the groove 18'.

In a preferred embodiment described above, the notch 28 prevents the snap ring 10 under the tab 27 from engaging the groove 18, thereby allowing axial deflection of the tab 27 while the remainder of the snap ring 10 is engaged in the groove 18. However, one skilled in the art would recognize that the tab 27 could alternatively be radially deflected if the notch 28 were provided to a depth such that the tab 27 could be pressed under the lug 30. In this case, upon axial movement of the snap ring 10, a motion comprising radial compression of the snap ring at the tab 27, or both rotation and radial compression of the tab 27 would then position the tab 27 under a lug 30 and the snap ring 10 would be installed within the groove 18 provided in the hub 14.

In the Figures, a plurality of teeth 40 are shown. Alternatively, although not shown here, any of the above embodiments could be accomplished using a single tooth 40 on the snap ring 10 to engage a lug 30 to prevent radial expansion of the snap ring and the tab 27 would engage a lug 30 to prevent rotation. The embodiments shown provide additional teeth and lugs to afford better radial security of the snap ring 10.

Figure 6:
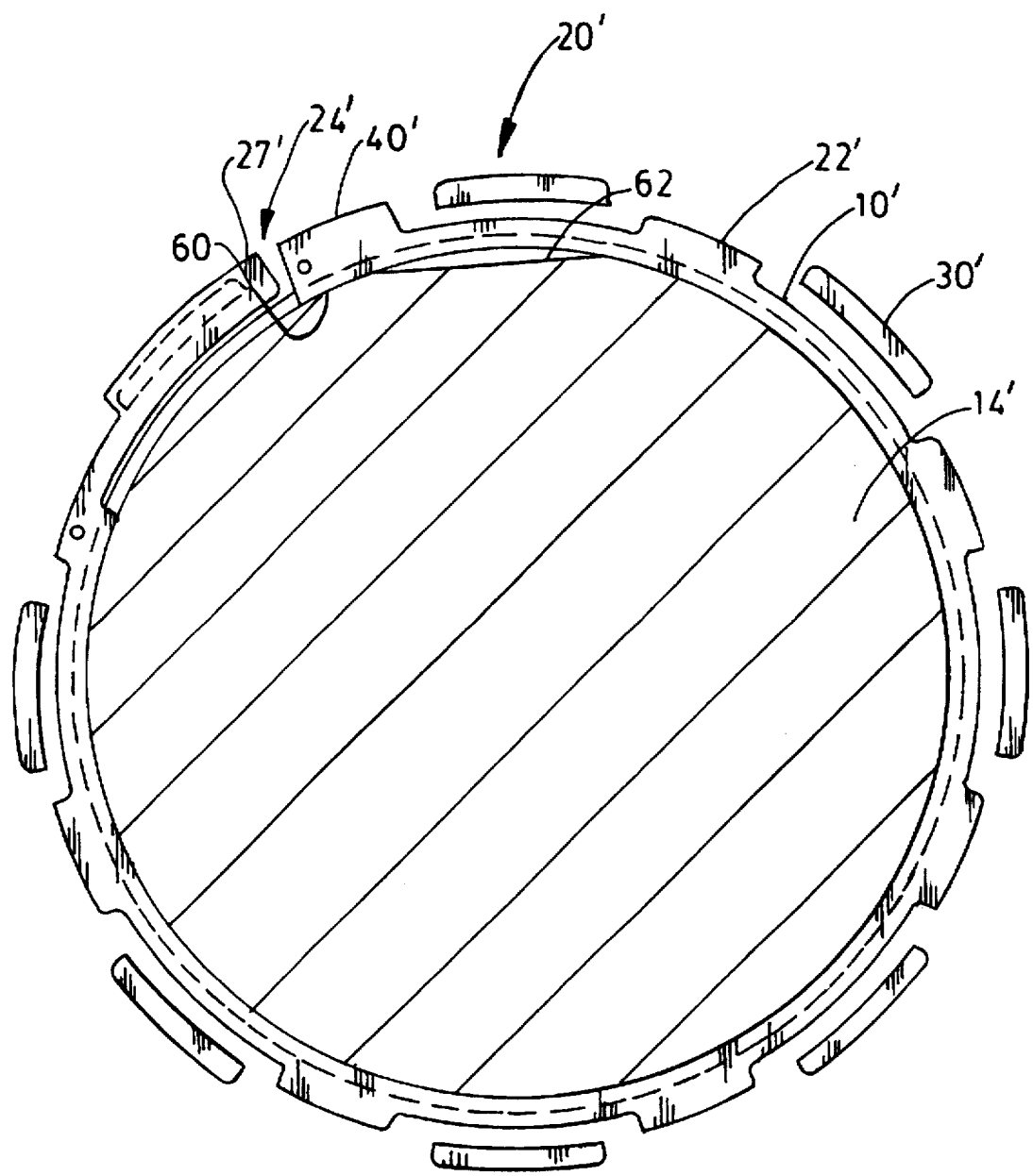
FIG. 6 is an end view of an alternate embodiment of a snap ring according to the present invention during installation.
Figure 7:
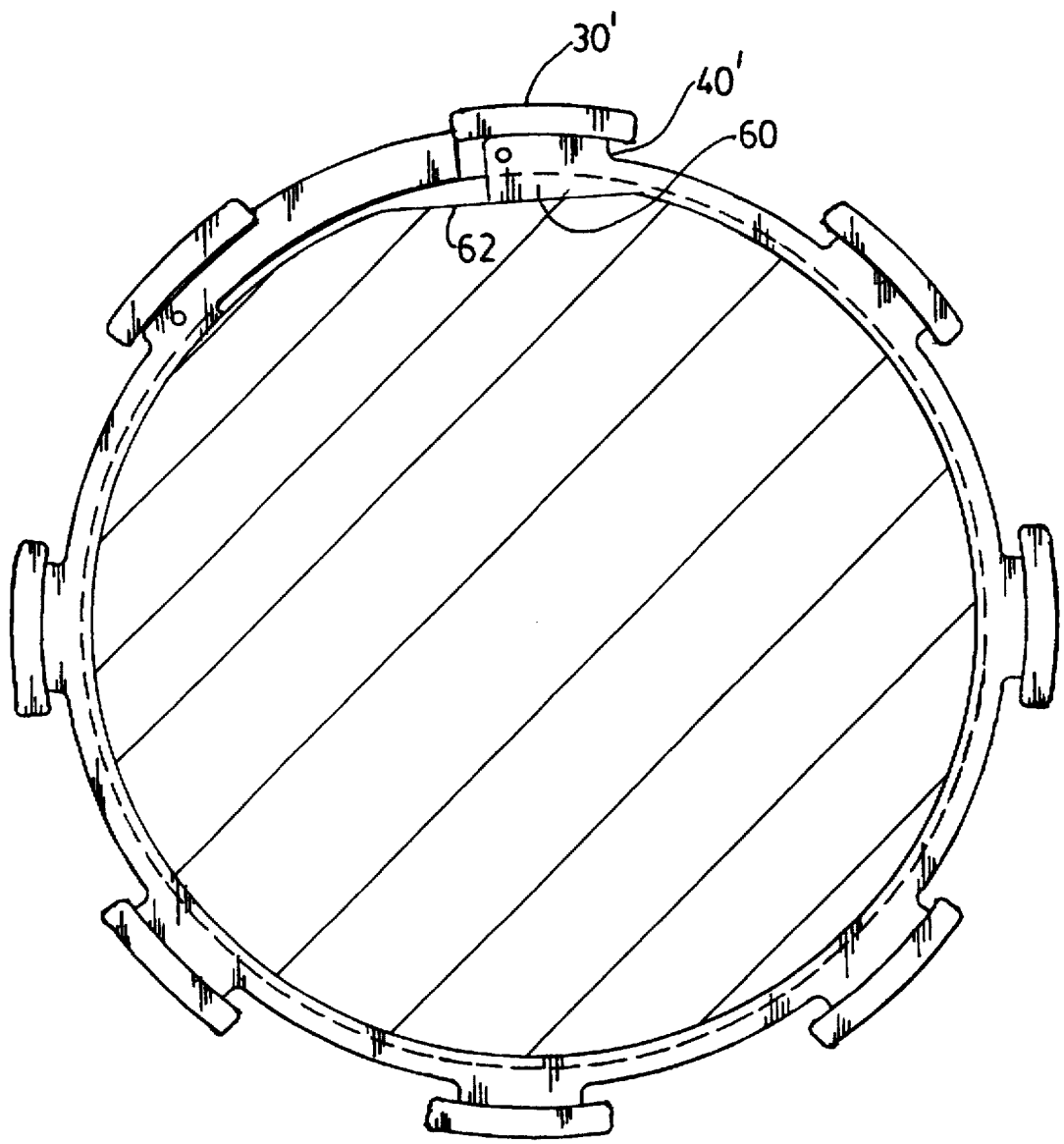
FIG. 7 is an end view of an alternate embodiment of a snap ring according to the present invention rotated to the installed position.

Furthermore, as shown in FIGS. 6 and 7, to prevent rotation of the snap ring 10' to the hub 14' and/or relative rotation of the rotating members 14', 20' an engagement means is provided on the snap ring 10', such as a protrusion 60 or post (not shown). A corresponding stop means is provided in the groove 18 of the hub 14', such as a flat 62, notch, or aperture. As shown in FIG. 6, the snap ring 10' is installed on the hub 14' as was described above. However, when rotated to the installed position as described above and shown in FIG. 7, the protrusion 60 engages the flat 62 provided in the groove. In the embodiment shown in FIGS. 6 and 7, the protrusion 60 and tooth 40' above the protrusion 60 are wedged between a lug 30' and the flat 62, thereby preventing relative rotation between the hub 14' and cylinder 20'. The tooth 40' and lug 30' prevent radial expansion of the snap ring 10' as described above, while the tab 27' prevents rotation of the snap ring 10' to the cylinder 20'.

Alternatively, although not shown here, the engagement means of FIGS. 6 and 7 could be of a configuration similar to that shown in U.S. Pat. No. 5,308,207, which is incorporated herein for its relevant teachings. In this embodiment, although not shown here, a post is provided on the snap ring 10' and an aperture or notch is provided in the hub 14'. The post engages the aperture in the hub to prevent relative rotation of the snap ring 10' and cylinder 20' to the hub 14'. The snap ring deflects radially outwardly to permit the post to engage the groove, and as the snap ring is rotated to the installed position, the post then drops into the aperture once the post and aperture are aligned. Alternatively, although not shown, one skilled in the art could provide an axial groove in the hub 14' to allow the post to axially traverse the groove when the snap ring 10' is installed.

Although in the embodiment shown in FIGS. 6 and 7 the engagement means is shown on the tooth 40 formed at the discontinuity 24', a protrusion 60 could be provided under any one of the other teeth 40'.

Although the preferred embodiments of the present invention has been disclosed, various changes and modifications may be made without departing from the scope of the invention as set forth in the appended claims.

I claim:

1. A snap ring for axially retaining a rotating member, comprising:

a generally annular member having an inner peripheral surface and an outer surface with a tooth projecting therefrom;

a tab projecting radially from the annular member for preventing rotation of said annular member; and means for substantially elastically deflecting said tab from a first position prior to installation to a second deflected position during installation, said tab resiliently returning substantially to said first position during installation, the means for deflecting said tab comprising a radial separation in the annular member circumferentially abutting the tab and a notch provided on said annular member adjacent said separation and said tab.

2. A snap ring according to claim 1, wherein the tab is axially deflectable.

3. A snap ring according to claim 2, wherein the annular member is a one-piece member.

4. A snap ring according to claim 3, further comprising a second projection on the inner peripheral surface of said annular member.

5. A snap ring according to claim 4, wherein said tooth is provided on the outer surface of said annular member radially disposed from the second projection and circumferentially aligned with the second projection.

6. A rotating assembly having a snap ring for relatively axially retaining a pair of rotating members, comprising:

a first of the relatively rotating members having an outer surface with an annular groove formed therein;

a second of the relatively rotating members, coaxial and partially coextensive with said first member, said second member having an inner surface positioned adjacent said outer surface and a plurality of circumferentially spaced lugs projecting over said groove; and the snap ring positioned in said groove, said snap ring having an outer surface with a tooth projecting therefrom aligned under one of said lugs and a deflectable tab engaged with said second member for preventing rotation of said snap ring with respect to said second member.

7. A rotating assembly according to claim 6, wherein the tab projects radially from the snap ring.

8. A rotating assembly according to claim 7, wherein the deflectable tab comprises a radial separation in the snap ring circumferentially abutting the tab and a notch provided on said snap ring adjacent said separation and said tab.

9. A rotating assembly according to claim 8, further comprising a second projection on the inner periphery of said snap ring.

10. A rotating assembly according to claim 9, wherein said tooth is provided on the outer periphery of said snap ring radially disposed from the second projection and circumferentially aligned with the second projection.

11. A rotating assembly according to claim 6, wherein the tab projects axially from the snap ring and the deflectable tab comprises a radial separation in the snap ring abutting the tab and a notch provided on said snap ring adjacent said tab and said separation.

12. A rotating assembly according to claim 11, further comprising a second projection on the inner periphery of said snap ring radially disposed from said tooth.

13. A rotating assembly according to claim 12, further comprising a stop means provided in said groove of said first member for engaging the second projection.

14. A method of relatively axially retaining a first relatively rotating member having an external surface and a second relatively rotating member having an internal surface and a plurality of circumferentially spaced lugs projecting therefrom, comprising the steps of:

forming an annular groove in the external surface of the first rotating member;

positioning said internal surface of the second member coaxial with the external surface of said first member;

providing a snap ring having a deflectable tab and an external tooth to be engagably received under one of said lugs;

aligning said tooth between two of said lugs;

positioning said snap ring substantially into said groove;

deflecting said tab; and rotating said snap ring until said tooth is aligned under one of said lugs and said deflectable tab is engaged with said second member to prevent rotation therebetween.

15. A method of axially retaining relatively rotating members according to claim 14, further comprising the steps of:

forming a second projection on the inner periphery of the snap ring;

forming a stop means for rotatably engaging the second projection of said snap ring, said stop means provided in said groove of said first member; and engaging the second projection and stop means when said snap ring is rotated.

* * * * *